Patented Feb. 21, 1928.

1,659,936

UNITED STATES PATENT OFFICE.

HENRY FLEETWOOD ALBRIGHT, JR., OF OAK PARK, ILLINOIS, ASSIGNOR TO WESTERN ELECTRIC COMPANY, INCORPORATED, OF NEW YORK, N. Y., A CORPORATION OF NEW YORK.

MOLDING COMPOSITION.

No Drawing.   Application filed December 27, 1923.   Serial No. 682,914.

This invention relates to molding compositions, and more particularly to improvements in organic molding compositions.

The term "organic molding composition" is applied to a class of products such as shellac compositions or phenolic condensation compositions which are usually brittle, non-flexible, and non-resilient. When machine work is attempted upon them, they frequently crack or chip. They are for this reason difficult to machine.

An object of this invention is to produce an organic molding composition having a lack of excessive brittleness and which can be successfully machined without cracking, breaking, or chipping.

Another object of this invention is to produce an organic molding composition having relatively great resilience and flexibility.

Molding compositions are in general of three classes—those which must be cured in the mold, those which must be treated to bring about a cure after being taken out of the mold, and those which are formed at a higher temperature and allowed to cool without in any way effecting a cure. All of these compounds will be found to have certain qualities which are sometimes objectionable, such as lack of resiliency, too great rigidity, brittleness, and the like.

This invention is based on the discovery that by adding a small percentage of rubber to these organic molding compositions, a more resilient and flexible molding compound may be obtained. It has been found that when such a molding compound is manufactured with the addition of a small percentage of rubber, it can be machined without difficulty and when struck with a hammer or other heavy implement shows less tendency to crack and break than the same composition without rubber.

For instance, in a composition made up of about 8 per cent shellac, 21 per cent kauri gum, 55 per cent mica, and 16 per cent vermilion, 3 per cent of smoked sheet rubber added to the mixture and thoroughly mixed therein produced a very resilient and high grade molding composition. Such a composition could be shaved with a sharp tool, and when struck with a hammer retained its shape. On the other hand, this same composition without the addition of the rubber cracked and chipped when any machine work was attempted upon it, and when struck with a hammer was reduced almost to a pulverized state.

The addition of rubber to the above described molding composition made the resulting composition sufficiently tough so that it could be used in a manner in which the unrubberized composition could not be used, such as for minature lamp bases and the like.

Any type of rubber may be added to a molding compound in small quantities to obtain the desirable qualities above mentioned. In the use of so-called shellac compositions, it has been found that smoked sheet rubber can be used with satisfactory results.

This invention is present wherever a small percentage of rubber is used in an organic molding compound to obtain greater resiliency, flexibility, and susceptibility to machining without the usual brittleness and other undesirable characteristics which are the properties of such compounds.

What is claimed is:

1. A molding composition comprising a compound composed of 8 per cent shellac, 21 per cent kauri gum, 55 per cent mica, and 16 per cent vermilion, and in addition a small quantity of rubber.

2. A molding composition comprising a compound composed of 8 per cent shellac, 21 per cent kauri gum, 55 per cent mica, and 16 per cent vermilion, and in addition a quantity of smoked sheet rubber equal to 3% of the first mentioned compound mixed therewith.

In witness whereof, I hereunto subscribe my name this 19th day of December A. D., 1923.

HENRY FLEETWOOD ALBRIGHT, Jr.